United States Patent [19]
Shirai et al.

[11] Patent Number: 6,079,383
[45] Date of Patent: Jun. 27, 2000

[54] ENGINE BALANCER UNIT

[75] Inventors: Makoto Shirai, Toyohashi; Hiroyoshi Tanikawa, Aichi-ken, both of Japan

[73] Assignee: Aisin Seiki Kabushiki Kaisha, Kariya, Japan

[21] Appl. No.: 09/189,397

[22] Filed: Nov. 10, 1998

[30] Foreign Application Priority Data

Nov. 10, 1997 [JP] Japan ................................. 9-307521

[51] Int. Cl.$^7$ ................................................. F02B 75/06
[52] U.S. Cl. ................................. 123/192.2; 123/196 R; 74/604
[58] Field of Search ............................ 123/192.2, 195 R, 123/196 R; 74/603, 604

[56] References Cited

U.S. PATENT DOCUMENTS

| | | | |
|---|---|---|---|
| 4,300,493 | 11/1981 | Berti ..................................... | 123/192.2 |
| 4,656,983 | 4/1987 | Anno .................................... | 123/196 R |
| 4,677,948 | 7/1987 | Candea ................................. | 123/192.2 |
| 5,000,140 | 3/1991 | Bates et al. .......................... | 123/192.2 |
| 5,535,643 | 7/1996 | Garza .................................... | 74/603 |
| 5,542,387 | 8/1996 | Okubo .................................. | 123/192.2 |
| 5,743,230 | 4/1998 | Yamazaki et al. .................. | 123/195 H |
| 5,788,381 | 8/1998 | Yamazaki et al. .................. | 384/400 |
| 5,875,753 | 3/1999 | Ishikawa .............................. | 123/192.2 |

FOREIGN PATENT DOCUMENTS

| | | |
|---|---|---|
| 0 260 174 | 3/1988 | European Pat. Off. . |
| 0 462 411 | 12/1991 | European Pat. Off. . |
| 0 809 041 | 11/1997 | European Pat. Off. . |
| 58-20750 | 2/1983 | Japan . |
| 58-36912 | 8/1983 | Japan . |

*Primary Examiner*—Willis R. Wolfe
*Assistant Examiner*—Brian J Hairston
*Attorney, Agent, or Firm*—Oblon, Spivak, McClelland, Maier & Neustadt, P.C.

[57] ABSTRACT

The engine balancer unit includes a first oil pan attaching to the bottom of an engine cylinder block, a second oil pan attaching to the first oil pan to close a bottom of the first oil pan, and a unitary case inserted in the first oil pan to support counterbalance shafts with balance weights. The cylinder block does not need to be modified to install the engine balancer unit because the first oil pan which encloses the unitary case is attached under the cylinder block. Further, fluid tightness between the first oil pan block is not spoiled by the unitary case because the unitary case is provided inside the first oil pan. Furthermore, fluid tightness between the first oil pan and the second oil pan is not spoiled by conventional fastening structure.

12 Claims, 7 Drawing Sheets

ENGINE BALANCER UNIT

BACKGROUND OF THE INVENTION

1. Field of the Invention

This application claims priority under 35 U.S.C. § 119 and/or 365 to "Engine Balancer Unit," Application No. H09307521 filed in JAPAN on Nov. 10, 1997, the entire content of which is herein incorporated by reference.

This invention relates to an engine balancer unit.

2. Description of the Related Art

In an engine for vehicle, a crankshaft may be unbalanced due to, for example, the secondary inertial force generated by reciprocal movement of the piston. Such an unbalance causes vibration of the engine. In order to reduce such unbalance, a conventional engine incorporates two counterbalance shafts which includes balance weights eccentrically provided from the axis of the counterbalance shafts. The counterbalance shafts are rotated by the crank shaft in the opposite direction. Further, the counterbalance shafts are supported by a unitary case for easy installation to the engine. Such conventional engine balancer unit are disclosed in Japanese Laid-Open utility Model Patent Publication No. 5820750 published on Feb. 8, 1983 or Japanese Utility Model Patent Publication No. 58-36912 published on Aug. 19, 1983.

Figure 6:
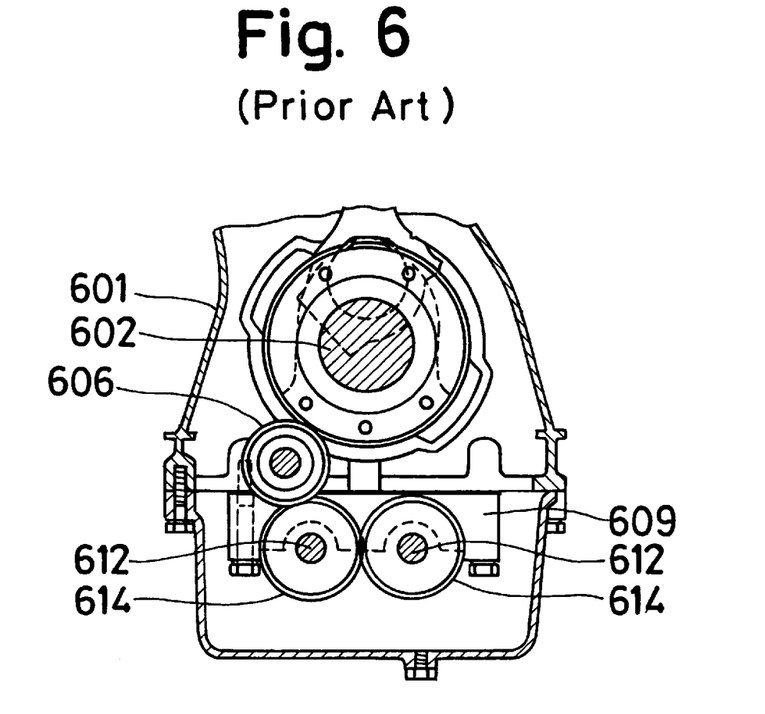
FIGS. 6 and 7 are cross sectional views of a conventional engine balancer unit.
Figure 7:
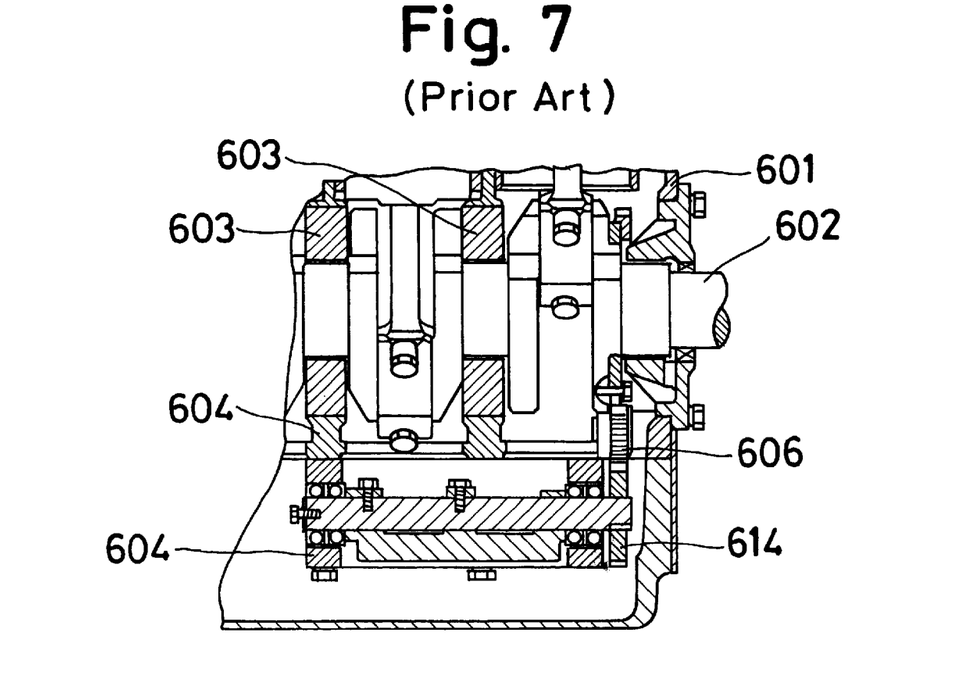

As shown in FIGS. 6 and 7, in Publication No. 5820750 a crankshaft 602 is supported by a shaft support 603 in a cylinder block 601. The shaft support 603 is mounted on an intermediate wall member 604 disposed in the cylinder block 601. Two counterbalance shafts 612 are supported by a unitary case 609 which is coupled to the intermediate wall members 604 in a detachable manner. The counterbalance shafts 612 are rotated by the crank shaft 602 through gears 606 and 614.

In this conventional design, for ease of installation to the engine, the balance weights are mounted on two counterbalance shafts 612 that are supported by the unitary case 609. However, the cylinder block 601 must be modified to create boss portions that become the intermediate wall members 604. Recently, standardization of the cylinder block has become important for low cost mass-production of engines. Enormous plant investment becomes necessary to change the manufacturing line of the cylinder block 601 to carry the engine balancer unit, so that engine manufacturing costs are greatly increased.

Figure 8:
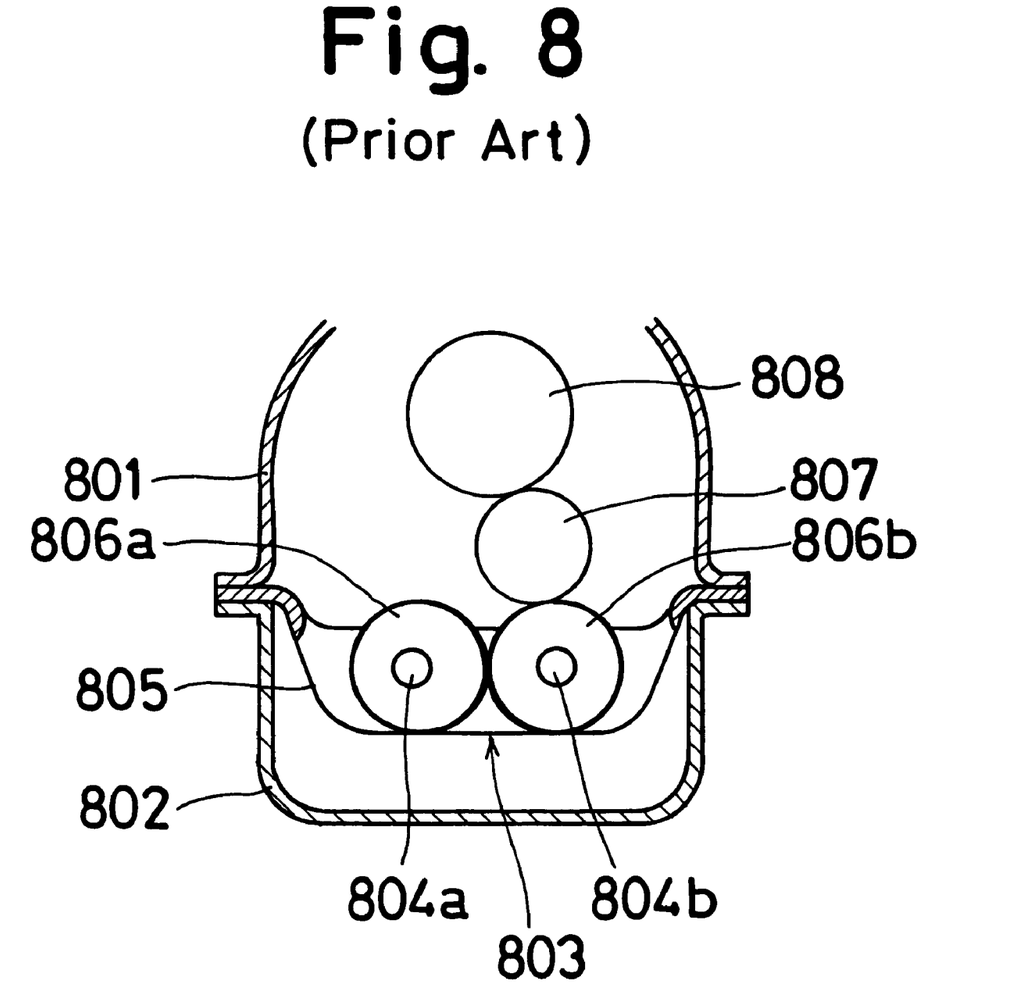
FIG. 8 is cross sectional view of a conventional engine balancer unit.

As shown in FIG. 8, in Publication No. 58-36912, two counterbalance shafts 804a and 804b are supported by a unitary case 805 which is held between a cylinder block 801 and an oil pan 802. The counterbalance shafts 804a and 804b are rotated by the crankshaft 808 through gears 807, 806a and 806b.

In this conventional design, the cylinder block 801 does not need to be modified to carry the engine balancer unit. However, engine oil may leak from either the junction with the cylinder block 801 or that with the oil pan 802. In other words, it is complicated to maintain fluid tightness at more than one junction with conventional fasteners. Further, the oil pan 802 may interfere with road surface obstacles, and the base part of the oil pan is likely to fail since the oil pan 802 extends downward by the thickness of the unitary case 805 which is inserted between the cylinder block 801 and the oil pan 802.

SUMMARY OF THE INVENTION

Accordingly, it is an object of the present invention is to solve the above conventional drawbacks.

Another object of the present invention is to easily mount and remove an engine balancer unit without increasing manufacturing costs.

Another object of the present invention is to easily mount and remove an engine balancer unit without spoiling the fluid tightness between the cylinder block and the oil pan.

To achieve the above and other objects, the present invention comprises a first oil pan attaching to a bottom of an engine cylinder block, a second oil pan attaching to the first oil pan to close a bottom of the first oil pan, and a unitary case inserted in the first oil pan to support counterbalance shafts with balance weights.

In the present invention, the cylinder block does not need to be modified to install the engine balancer unit because the first oil pan which encloses the unitary case is attached under the cylinder block. Further, fluid tightness between the first oil pan and the cylinder block is not spoiled by the unitary case because the unitary case is provided inside the first oil pan. Furthermore, fluid tightness between the first oil pan and the second oil pan is not spoiled by a conventional common fastening structure.

DETAILED DESCRIPTION OF THE PREFERRED EMBODIMENTS

Figure 1:
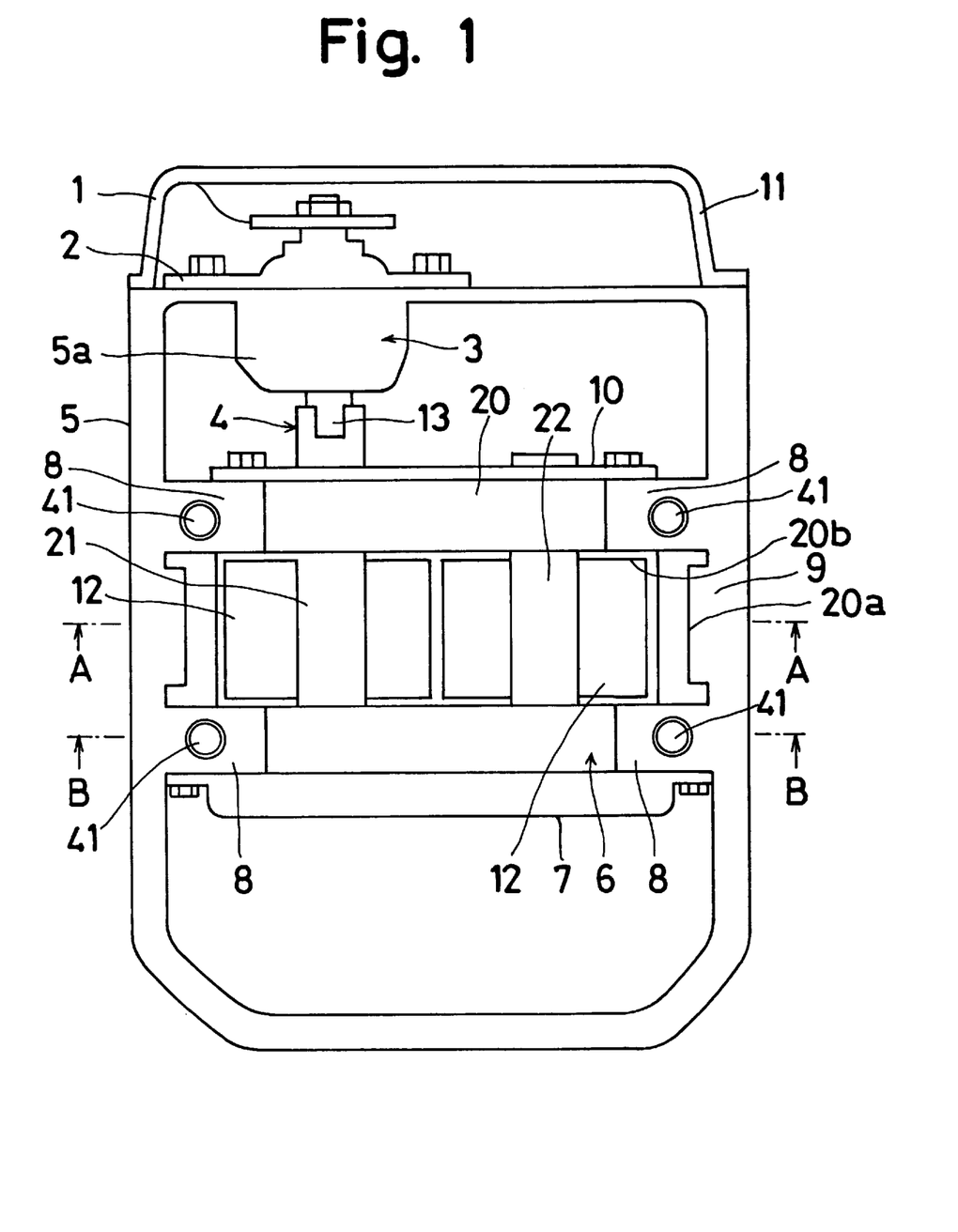
FIG. 1 is a plan view of an engine balancer unit according to the first embodiment of the present invention.
Figure 2:
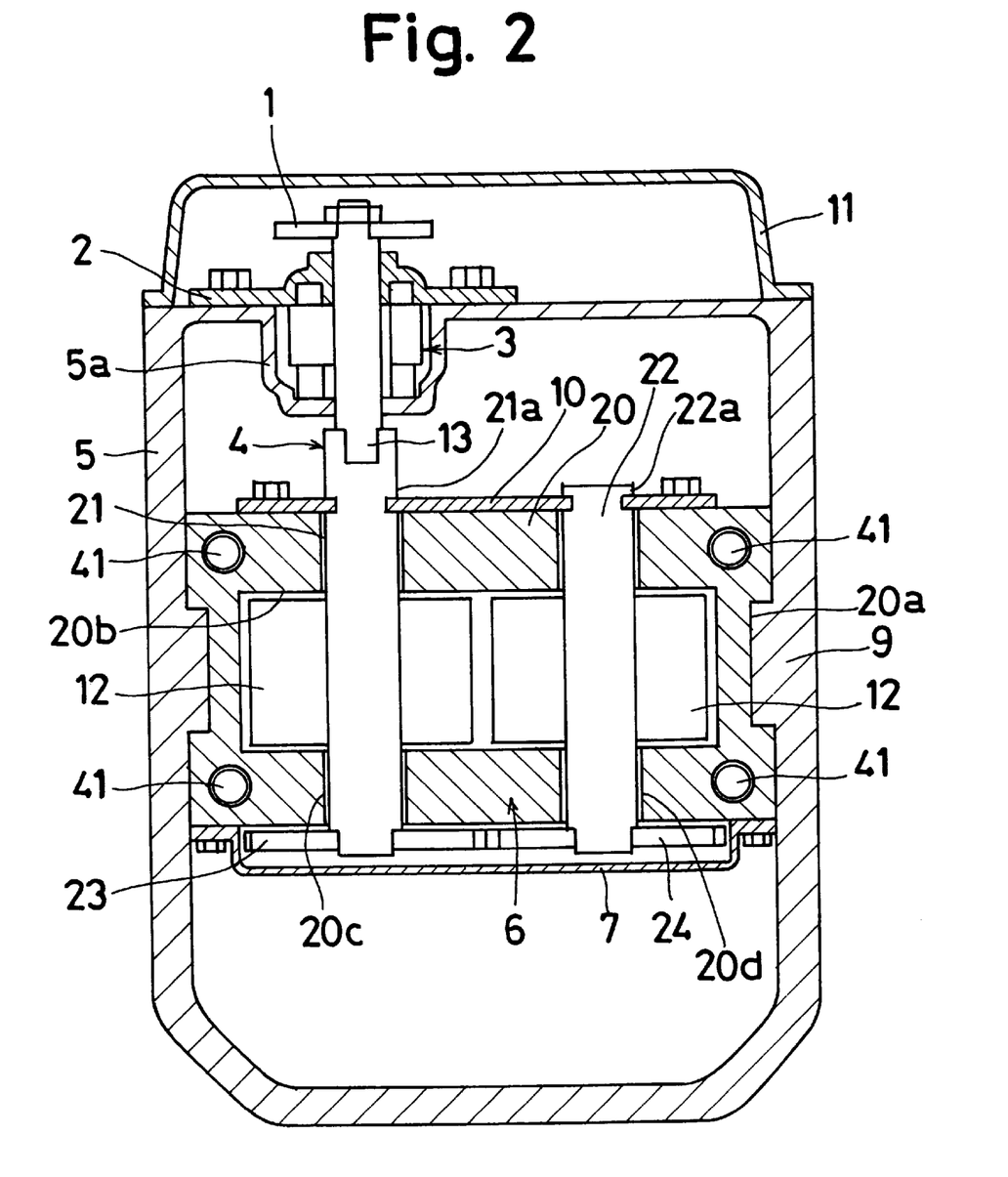
FIG. 2 is a cross sectional view of the engine balancer unit shown in FIG. 1.
Figure 3:
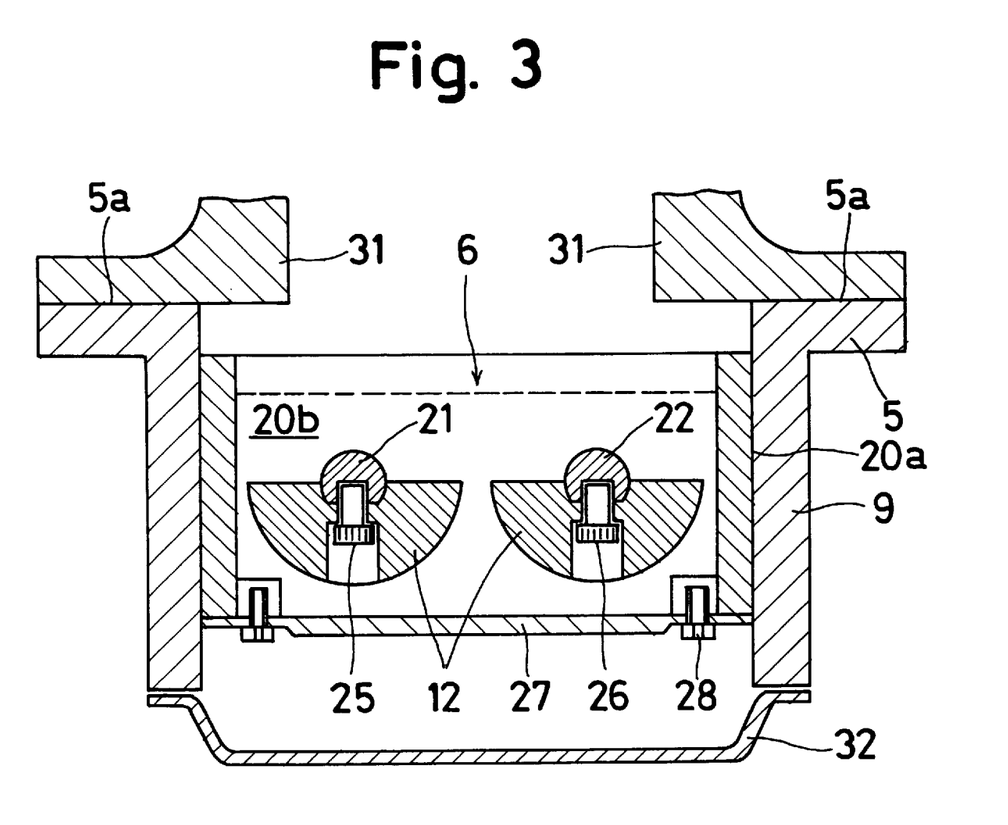
FIG. 3 is a cross sectional view of the engine balancer unit taking along a line A—A in FIG. 1.
Figure 4:
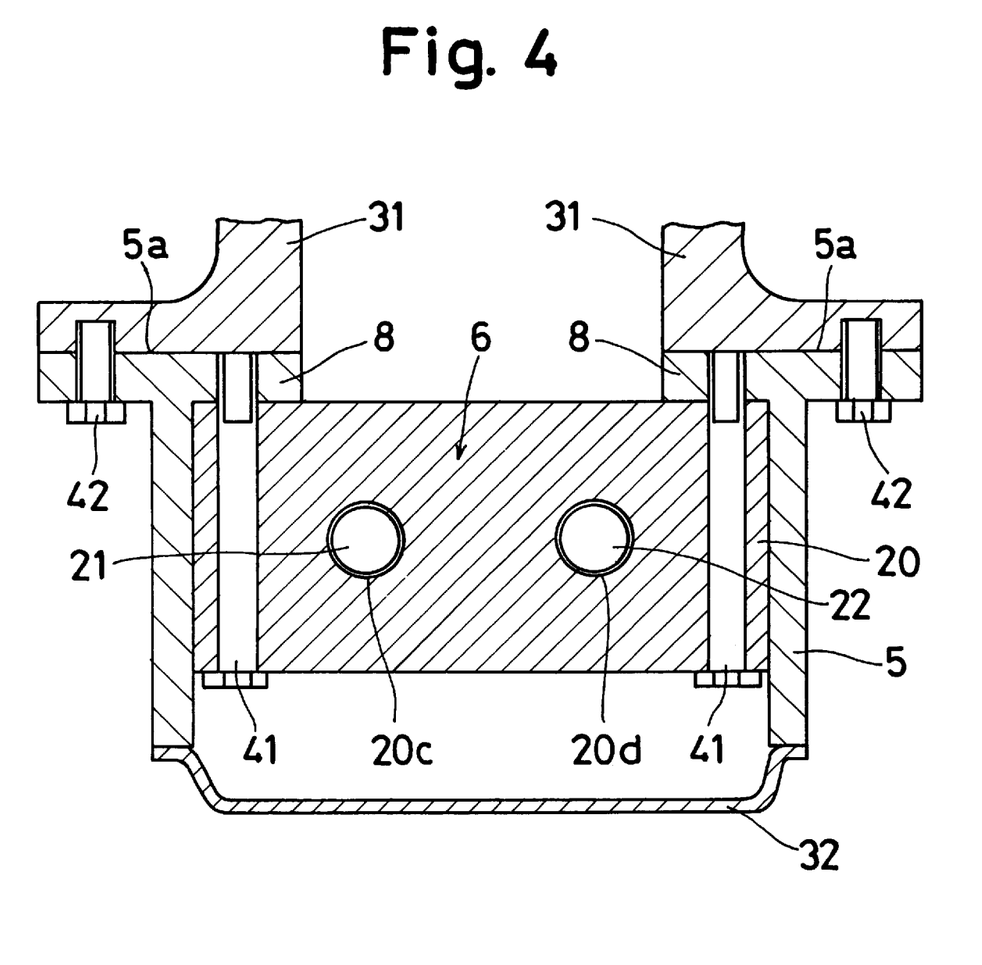
FIG. 4 is a cross sectional view of the engine balancer unit taking along a line B—B in FIG. 1.

FIGS. 1 to 4 show a first embodiment of the present invention. A first oil pan 5 is a hollow member having openings at top and bottom ends. The first oil pan is made of aluminum. As shown in FIG. 4, the top end of the first oil pan 5 is fixed to the cylinder block 31 in fluid tight manner by bolts 42. A gasket (not shown) is pinched between the cylinder block 31 and the first oil pan 5. Further, as shown in FIGS. 3 and 4, a second oil pan 32 is fixed to the bottom end of the first oil pan in fluid tight manner by bolts (not shown). A gasket (not shown) is pinched between the first oil pan 5 and the second oil an 32. The bottom end of the first oil pan 5 is closed by the second oil pan 32. The second oil pan 32 is made of the material which is hard to deform such as steel or aluminum. Noise due to the rotation of the crank shaft and the rotation of counterbalance shafts 21, 22 is restrained by this structure. Further, failure of the first oil pan 5 by interference between the second oil pan 32 and a road surface obstacle is also thereby prevented. As shown by the dashed line in FIG. 3, a predetermined quantity of engine lubricating oil is filled in the first and the second oil pans 5 and 32.

As shown in FIG. 2, in the first oil pan 5, a balancer unit 6 is mounted in a detachable manner. The balancer unit 6 includes two counterbalance shafts 21 and 22 which are rotatably supported by a case 20. The counterbalance shafts 21 and 22 extend parallel to each other. Further, the balancer unit 6 includes a thrust plate and gears 23, 24. As shown in FIG. 3, the balancer unit 6 includes two of half cylinder shaped balance weights 12 that are mounted in the center of the counterbalance shafts 21 and 22 by bolts 25 and 26. FIG. 2 also shows that the case 20 has a hollow space 20b and two pairs of shaft holes 20c and 20d where both ends of the counterbalance shafts 21 and 22 are rotatably supported. The hollow space 20b opens at top and bottom ends. Further, the hollow space 20b is sufficiently large to permit rotation of the balance weights 12. Both ends of the counterbalance shafts 21 and 22 are projected outwardly from the case 20. Gears 23 and 24 are fixed to the ends of the shafts 21 and 22. The gears 23 and 24 are meshed together so that the counterbalance shaft 21 always rotates in the opposite direction of the counterbalance shaft 22. Further, the meshed gears 23 and 24 maintain the relative position of two balance weights 12 as shown in FIG. 3. The gears 23 and 24 are protected by a gear cover 7.

The counterbalance shafts 21 and 22 have annular grooves 21a and 22a at the opposite ends to the gears 22 and 23. The thrust plate 10 is coupled in the annular grooves 21a and 22a to limit axial and radial movements of the counterbalance shafts 21 and 22. The thrust plate 10 is fixed to the case 20 by bolts.

In the present embodiment, the unitary balancer unit 6 is inserted from the bottom of the first oil pan 5. The first oil pan 5 is joined to a cylinder block 31 at a junction 5a. The balancer unit 6 is fitted into the first oil pan 5 from below and is guided therein toward the junction 5a by a pair of vertical projections 9 extending from the top end to the bottom end (in a perpendicular direction to the plane of FIGS. 1 and 2). A pair of grooves 20a are formed on the outer sides of the case 20 to hold the projections 9. Therefore, exact positioning of the case 20 is determined with respect to the first oil pan 5 in the axial direction of the counterbalance shafts 21 and 22. Of course, the projections 9 could instead be formed on the case 20 and cooperate with grooves formed in the oil pan. As shown in FIGS. 1 and 4, four boss parts 8 are formed integrally on the first oil pan 5. The exact vertical position of the case 20 is determined by the contact of the boss parts 8 with the top end of the case 20. The balancer unit 6 is then fixed to the boss parts 8 with four bolts 41. In this embodiment, the bottom cover 27 is fixed to the case 20 so as to close the bottom end of the hollow space 20b. The bottom cover 27 prevents lubricating oil from entering into the hollow space 20b from the periphery of the case 20 except for lubricating oil falling from the top. By the way, the first oil pan 5 may be used regardless of the presence of the balancer unit 6.

An oil pump 3 is provided at one axial end of the first oil pan 5. Due to the location of the oil pump 3, it may have a good cold start pumping characteristics. The oil pump 3 includes a pump housing 5a made by a recess which is integrally formed on the side of the first oil pan 5. The pump housing 5a is coaxial with one of the counterbalance shafts 21 and 22. At the bottom of the pump housing 5a, a center hole is provided to insert a pump shaft 13. An inner rotor is integrally mounted on the pump shaft 13. An outer rotor is rotatably supported between the inner rotor and the pump housing 5a. Meshed gear teeth are formed on the inner and outer rotors. A pump cover 2 closes the pump housing 5a. The pump cover 2 also support the other end of the pump shaft 13. A sprocket wheel 1 is fixed at the other end of the pump shaft 13. The sprocket wheel 1 is rotated by the crank shaft (not shown) through a chain (not shown). The oil pump housing 5a has inlet and outlet ports (not shown). When the pump shaft 13 rotates, due to internal volume changes, the oil pump 3 takes in lubricating oil from the first oil pan 5 and the second oil pan 32 and pumps the lubricating oil to various parts of the engine. A serration of the pump shaft 13 is connected to a slot of the counterbalance shaft 21, which constitutes a well known Oldham coupling 4. When the pump shaft 13 rotates, the counterbalance shafts 21 and 22 are rotated through the gears 23 and 24.

While the engine operates, the crank shaft (not shown) is rotated. The rotation of the crank shaft is transmitted to the sprocket wheel 1 through the chain (not shown) so as to rotate and operate the oil pump 3. The rotation of the oil pump 3 is further transmitted to the counterbalance shaft 21 through the Oldham coupling 4. The rotation of the counterbalance shaft 21 is transmitted to the other counterbalance shaft 22 through the gears 23 and 24. Thus, the counterbalance shaft 22 is rotated in the opposite direction to the counterbalance shaft 21 so that inertial vibrations of the engine are effectively reduced.

In the present embodiment, the counterbalance shafts 21 and 22 are integrated with the case 20. The case 20 is fixed inside of the first oil pan 5 in detachable manner. Since the first oil pan 5 is coupled to the bottom of the cylinder block 31 in fluid tight manner, the cylinder block 31 does not need to be modified to mount the engine balancer unit. Therefore, increases in manufacture cost may be restrained greatly since no significant modification is necessary to the cylinder block 31. Further, in the present embodiment, the case 20 is mounted to the first oil pan 5 using the boss parts 8, the vertical projections 9 and the grooves 20a. Since the boss parts 8, the vertical projections 9 and the grooves 20a are all provided inside the first oil pan 5, fluid tightness is easily maintained between the cylinder block 31 and the first oil pan 5. Furthermore, since the cylinder block 31 and the second oil pan 32 are separately fastened to the first oil pan 5, fluid tightness is well maintained among the cylinder block 31, the first oil pan 5 and second oil pan 32.

In the present embodiment, the bottom end of the hollow space 20b is closed by the bottom cover 27 and less lubricating oil is collected in the hollow space 20b. Therefore, balance weights 12 do not rotate in the lubricating oil so that there is less power loss by stirring lubricating oil. Further, as shown in FIGS. 3 and 4, the balancer unit 6 bridges the bottom end of the cylinder block 31 together with the first oil pan 5 so that the balancer unit 6 may function as a reinforcement member of the cylinder block 31. Thus, weight of the cylinder block 31 may be reduced.

Figure 5:
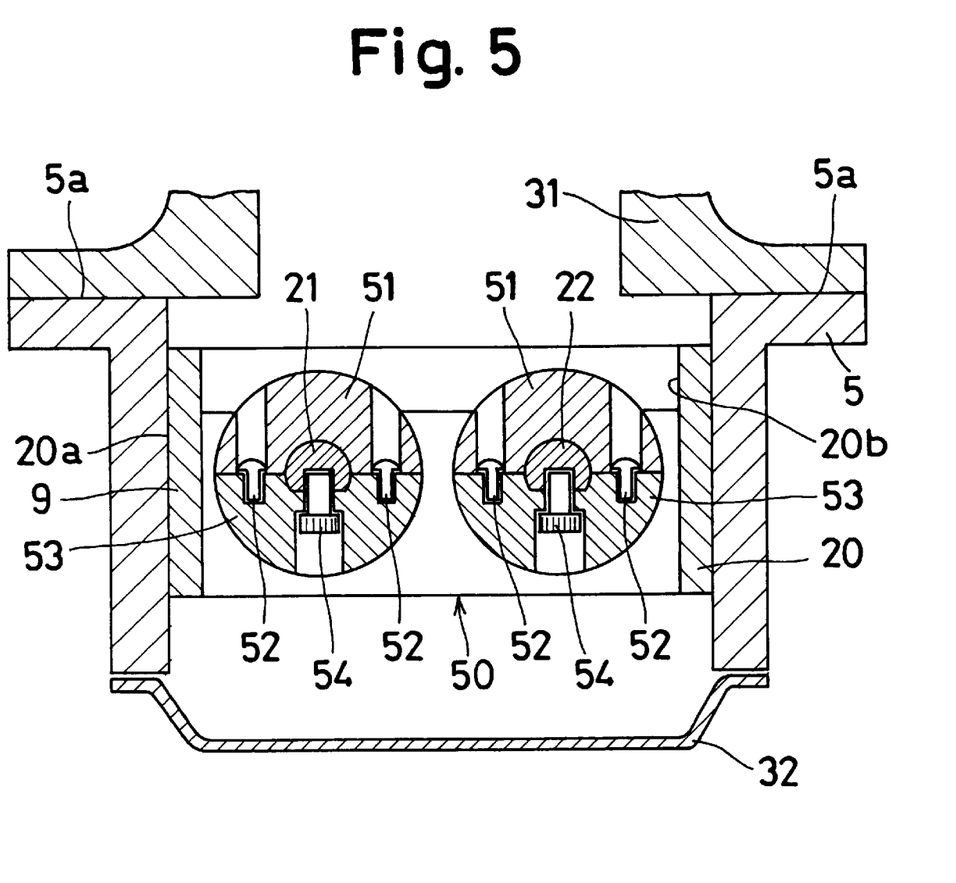
FIG. 5 is a cross sectional view of an engine balancer unit according to the second embodiment of the present invention.

FIG. 5 shows a second embodiment of the present invention. In the first embodiment, lubricating oil may not be stirred by the balance weights 12 since the bottom cover 27 is employed so as not to collect the lubricating oil in the hollow space 20b. However, in the second embodiment, the bottom cover 27 is omitted so that, the bottom end of the hollow space 20b remains open. Instead of the bottom cover 27 a pair of half-cylinder-shaped plastic covers 51 are fixed to a pair of balance weights 53 by screws 52 so that the balance weights 53 and plastic covers 51 constitute cylinder bodies. The power losses due to stirring of the lubricating oil are nonetheless low since the lubricating oil will be less stirred by cylinder shaped bodies. The other elements of the second embodiment are substantially the same as the first embodiment. Therefore, a detailed explanation will be omitted while giving the same numbers as in FIGS. 1 to 4.

Various modifications may be made without departing from the spirit of the present invention. For example, in the first and second embodiments, the bolts 41 are inserted from the bottom end of the first oil pan 5 to fix the balancer unit 6, 50 to the first oil pan 5. However, the boss parts 8 may be formed at the bottom end of the first oil pan 5 so that the bolts 41 are inserted from the top end of the first oil pan 5.

In the present invention, the cylinder block 31 does not need to be modified to install the engine balancer unit 6, 50 because the first oil pan 5 which encloses the unitary case 20 is attached under the cylinder block 31. Further, fluid tightness between the first oil pan 5 and the cylinder block 31 is not spoiled by the unitary case 20 because the unitary case 20 is provided inside the first oil pan 5. Furthermore, fluid tightness between the first oil pan 5 and the second oil pan 32 is not spoiled by the conventional fastening structure.

Obviously, numerous modifications and variations of the present invention are possible in light of the above teachings. It is therefore to be understood that within the scope of the appended claims, the invention may be practiced otherwise than as specifically described herein.

What is claimed is:

1. An engine balancer joined to an cylinder block of an engine, comprising:
   a case;
   a pair of counter counterbalance shafts rotatably supported by the case;
   a pair of counterbalance weights fixed to the counterbalance shafts;
   a first oil pan joined to the cylinder block and enclosing the case; and
   a second oil pan joined to the first oil pan for collecting lubricating oil.

2. An engine balancer according to claim 1, further comprising:
   a joint portion provided on the first oil pan for contacting with the cylinder block; and
   bolts fixing the case to the joint portion.

3. An engine balancer according to claim 2, wherein the joint portion is extended inside the first oil pan.

4. An engine balancer according to claim 1, further comprising:
   a joint portion provided on the first oil pan for contacting with the second oil pan; and
   bolts fixing the case to the joint portion.

5. An engine balancer according to claim 4, wherein the joint portion is extended inside the first oil pan.

6. An engine balancer according to claim 1, further comprising a reinforcing member for reinforcing the cylinder block.

7. An engine balancer according to claim 6, further comprising:
   a projection formed on one of the case and the first oil pan; and
   a groove formed on the other of the case and the first oil pan for engaging with the projection such that an exact position of the case may be determined with respect to the first oil pan.

8. An engine balancer according to claim 6, wherein the reinforcing member includes the case and the first oil pan.

9. An engine balancer according to claim 1, further comprising an oil restrictor provided in the case for reducing stirring of the lubricating oil.

10. An engine balancer according to claim 9, wherein the oil restrictor is a bottom cover fixed to the case for prevent the lubricating oil from entering the case.

11. An engine balancer according to claim 9, wherein the oil restrictor is a pair of plastic covers attached to the balance weights.

12. An engine balancer according to claim 1, wherein the case comprises a unitary case.

* * * * *